United States Patent
Kamat

(10) Patent No.: US 10,557,025 B2
(45) Date of Patent: Feb. 11, 2020

(54) POLYPROPYLENE CAP OR FILM COMPOSITION

(71) Applicant: FINE ORGANICS INDUSTRIES PVT. LTD., Mumbai (IN)

(72) Inventor: Prakash Damodar Kamat, Mumbai (IN)

(73) Assignee: FINE ORGANICS INDUSTRIES PVT LTD., Mumbai (IN)

( * ) Notice: Subject to any disclaimer, the term of this patent is extended or adjusted under 35 U.S.C. 154(b) by 84 days.

(21) Appl. No.: 15/572,048

(22) PCT Filed: May 6, 2016

(86) PCT No.: PCT/IN2016/000119
§ 371 (c)(1),
(2) Date: Nov. 6, 2017

(87) PCT Pub. No.: WO2016/178245
PCT Pub. Date: Nov. 10, 2016

(65) Prior Publication Data
US 2018/0105685 A1 Apr. 19, 2018

(30) Foreign Application Priority Data
May 7, 2015 (IN) .......................... 1815/MUM/2015

(51) Int. Cl.
| | |
|---|---|
| *C08L 23/12* | (2006.01) |
| *C08L 23/04* | (2006.01) |
| *C08L 23/16* | (2006.01) |
| *C08K 5/20* | (2006.01) |
| *B65D 39/00* | (2006.01) |
| *C08K 3/34* | (2006.01) |
| *C08K 5/09* | (2006.01) |
| *C08K 5/10* | (2006.01) |

(52) U.S. Cl.
CPC ........... *C08L 23/12* (2013.01); *B65D 39/0029* (2013.01); *C08K 3/34* (2013.01); *C08K 5/09* (2013.01); *C08K 5/10* (2013.01); *C08K 5/20* (2013.01); *C08L 23/04* (2013.01); *C08L 23/16* (2013.01)

(58) Field of Classification Search
USPC ....................................................... 524/232
See application file for complete search history.

(56) References Cited

U.S. PATENT DOCUMENTS

| | | | |
|---|---|---|---|
| 2002/0077396 A1 | 6/2002 | Yu et al. | |
| 2003/0105198 A1 | 6/2003 | Plume et al. | |
| 2006/0199911 A1* | 9/2006 | Markovich | ......... C08L 23/0815 525/192 |
| 2010/0200606 A1 | 8/2010 | Davis et al. | |
| 2012/0101201 A1* | 4/2012 | Townsend | ............. C07C 233/05 524/232 |
| 2014/0371397 A1* | 12/2014 | Ribour | .................... C08L 23/06 525/240 |

FOREIGN PATENT DOCUMENTS

| | | | |
|---|---|---|---|
| CN | 1076187 | * | 9/1993 |
| WO | WO 01/62837 | | 8/2001 |

OTHER PUBLICATIONS

The International Search Report issued in International patent application No. PCT/IN2016/000119, dated Aug. 12, 2016.

* cited by examiner

*Primary Examiner* — Deve V Hall
(74) *Attorney, Agent, or Firm* — Seyfarth Shaw LLP

(57) ABSTRACT

A polypropylene or polyethylene cap composition comprising at least 94% by weight of polypropylene or polyethylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide.

4 Claims, No Drawings

POLYPROPYLENE CAP OR FILM COMPOSITION

The present invention relates to a polypropylene cap or film composition with a slip agent comprising a mixture of linear saturated fatty amide(s) and glycerol monostearate.

BACKGROUND OF THE INVENTION

Polypropylene is utilized extensively across a wide range of industries in a variety of product forms, such as fibers, films and three-dimensional structures. An important application for polypropylene is container, especially for food and beverages. Polypropylene material often are selected for use in food and beverage packs and closures as they are inexpensive, lightweight, easily moulded and resistant to impact.

Polyethylene material is also used in food and beverage packs and closures & in films.

Polypropylene or polyethylene do have certain undesirable attributes for example, they frequently contribute off-taste to the packaged product such as liquids. This off-taste may be contributed by unsaturated slip agents such as erucamide. Slip agents are used to reduce the force required to remove the closure from a bottle or package.

It is well known in the art to make caps with erucamide as a slip agent which facilitates unscrewing of the cap. However, erucamides are ethylenically-unsaturated amides that react with ozone that is used for sterilization, thereby creating aldehyde off-tastes that adversely affect beverage products such as carbonated water and soft drinks.

U.S. Pat. No. 4,785,042 (assigned to M/s Idemitsu Petrochemical Co. Ltd.) discloses stearylbehenamide for improving slipping and sliding properties of polyethylene resins to be used in films. However, it does not disclose use of a mixture of linear saturated fatty amides and glycerol mono stearate.

U.S. Pat. No. 5,948,846 (assigned to M/s Solvay) discloses use of zeolite in polyolefin compositions for improving organoleptic properties and good slip.

U.S. Pat. No. 6,806,313 (assigned to M/s W. R. Grace & Co.) discloses use of saturated amides and an oxidized polyethylene as slip aid for a matrix polymer, copolymer or blend thereof. However, the use of linear saturated fatty amides with glycerolmonostearate has not been disclosed.

Journal of the American Oil Chemists' Society (1955), 32, 354-6 discloses esteramides of certain aminoalcohols as plasticizers.

United States Published Patent Application No. 20120101201 (assigned to M/s Croda International PLC) teaches saturated branched hydrocarbon chain fatty amides as mold release agents.

U.S. Pat. No. 6,846,863 (assigned to M/s Solvay Polyolefins Europe-Belgium) discloses use of saturated fatty acid amide viz. behenamide as slip agent in polyolefin screw caps for bottles. However, the use of saturated amides, such as behenamide, while avoiding the off-taste problem, tend to be less effective as slip agents because it is believed that they migrate slowly to the surface of the matrix polymer and thereby are less efficacious in providing a low-friction surface.

None of the above references teach use of mixture of linear saturated fatty amides and glycerol monostearate as slip agent in polypropylene cap composition for reducing torque release and providing improved organoleptic properties of liquid stored in liquid containers sealed with the polypropylene cap when compared with erucamide.

Also, none of the above references teach use of mixture of linear saturated fatty amides and glycerol monostearate as slip agent in polyethylene cap composition for reducing torque release and providing improved organoleptic properties of liquid stored in liquid containers sealed with the polyethylene cap when compared with erucamide.

OBJECT OF THE INVENTION

The object of the present invention is to provide a polypropylene cap composition with a slip and/or antiblocking agent comprising a mixture of linear saturated fatty amide(s) and glycerol monostearate with % torque release of the cap comparable to that provided by unsaturated fatty amide, erucamide, wherein the cap is used to seal liquid containers and provides improved organoleptic properties when compared with erucamide.

Yet another object of the present invention is to provide a polyethylene cap composition with a slip and/or antiblocking agent comprising a mixture of linear saturated fatty amide(s) and glycerol monostearate with % torque release of the cap comparable to that provided by unsaturated fatty amide, erucamide, wherein the cap is used to seal liquid containers and provides improved organoleptic properties when compared with erucamide.

SUMMARY OF THE INVENTION

A polypropylene cap composition comprising at least 94% by weight of polypropylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions.

A polypropylene cap composition comprising at least 94% by weight of polypropylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions; wherein the processed cap is used to seal liquid containers and provides improved organoleptic properties when compared with erucamide.

A polypropylene film composition comprising at least 94% by weight of polypropylene, 0.05 to 1% by weight of a slip and/or antiblocking agent comprising a mixture of linear saturated fatty amide and glycerol monostearate in the ratio ranging from 1:3 to 3:1 by weight with static and kinetic coefficient of friction comparable to the unsaturated fatty amide erucamide.

A polyethylene cap composition comprising at least 94% by weight of polyethylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions.

A polyethylene cap composition comprising at least 94% by weight of polyethylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions; wherein the processed cap is used to seal liquid containers and provides improved organoleptic properties when compared with erucamide.

A polyethylene film composition comprising at least 94% by weight of polyethylene, 0.05 to 1% by weight of a slip and/or antiblocking agent comprising a mixture of linear saturated fatty amide and glycerol monostearate in the ratio ranging from 1:3 to 3:1 by weight with static and kinetic coefficient of friction comparable to the unsaturated fatty amide erucamide.

DESCRIPTION OF THE INVENTION

We have surprisingly found that when a mixture of linear saturated fatty amide(s) and glycerol monostearate is used as slip and/or antiblocking agent in polypropylene or polyethylene cap or film composition the % torque release is comparable to that provided by unsaturated fatty amide erucamide at room temperature and under refrigerated conditions.

The linear saturated fatty amide may be selected from amides containing at least 12 carbon atoms and mixtures thereof. The preferred amide is behenamide.

The glycerol monostearate used in the present invention is at least 90% pure. The ratio of linear saturated fatty amide(s) and glycerol monostearate ranges from 1:3 to 3:1 by weight.

The amount of slip and/or antiblocking agent comprising a mixture of linear saturated fatty amide(s) and glycerol monostearate in the ratio ranging from 1:3 to 3:1 by weight used in the present invention is 0.05 to 1.0% by weight of the polypropylene or polyethylene.

The polypropylene or polyethylene cap composition of the present invention aids in lowering torque release and is comparable to the slip agent erucamide.

The term torque release is the moment of a force tending to cause rotation of an appropriate closure in a direction opposite to that of closing, causing the closure to be unsecured from its position on the neck finish of an appropriate container.

The cap prepared by using the polypropylene or polyethylene cap composition of the present invention is used to seal liquid containers.

According to the first embodiment of the present invention is a polypropylene cap composition with slip and/or antiblocking agent comprising a mixture of linear saturated fatty amide(s) and glycerol monostearate in the ratio ranging from 1:3 to 3:1 by weight which aids in lowering torque release and is comparable to the lowering of torque release by the unsaturated fatty amide erucamide.

Specifically a polypropylene cap composition comprising at least 94% by weight of polypropylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions.

According to the second embodiment of the present invention is a polypropylene cap composition with slip and/or antiblocking agent comprising a mixture of linear saturated fatty amide(s) and glycerol monostearate in the ratio ranging from 1:3 to 3:1 by weight which is comparable to the lowering of torque release by the unsaturated fatty amide erucamide and provides improved organoleptic properties of the liquid as compared to erucamide.

Preferably, a polypropylene cap composition comprising at least 94% by weight polypropylene, 0.05 to 1% by weight of a slip and/or antiblocking agent comprising mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions; wherein the processed cap is used to seal liquid containers and provides improved organoleptic properties when compared with erucamide.

The polypropylene cap prepared by using polypropylene cap composition of the present invention is used to seal liquid containers and provide better retention of the organoleptic properties of the liquid as compared to erucamide. The liquids may be mineral water or carbonated drinks.

The polypropylene cap composition of the present invention comprising a mixture of linear saturated fatty amide(s) and glycerol monostearate in the ratio ranging from 1:3 to 3:1 by weight is stable at processing temperature range and retains color intensity of caps.

The polypropylene cap composition of the present invention comprising a mixture of linear saturated fatty amide(s) and glycerol monostearate in the ratio ranging from 1:3 to 3:1 by weight has improved yellowness index when compared with erucamide.

According to the third embodiment of the present invention is a polypropylene film composition with slip and/or antiblocking agent comprising a mixture of linear saturated fatty amide(s) and glycerol monostearate in the ratio ranging from 1:3 to 3:1 by weight with static and kinetic coefficient of friction comparable to the unsaturated fatty amide erucamide.

Preferably, a polypropylene film composition comprising at least 94% by weight of polypropylene, 0.05 to 1% by weight of a slip and/or antiblocking agent comprising a mixture of linear saturated fatty amide and glycerol monostearate in the ratio ranging from 1:3 to 3:1 by weight with static and kinetic coefficient of friction comparable to the unsaturated fatty amide erucamide.

According to the fourth embodiment of the present invention is a polyethylene cap composition with slip and/or antiblocking agent comprising a mixture of linear saturated fatty amide(s) and glycerol monostearate in the ratio ranging from 1:3 to 3:1 by weight which aids in lowering torque release and is comparable to the lowering of torque release by the unsaturated fatty amide erucamide.

Specifically a polyethylene cap composition comprising at least 94% by weight of polyethylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions.

According to the fifth embodiment of the present invention is a polyethylene cap composition with slip and/or antiblocking agent comprising a mixture of linear saturated fatty amide(s) and glycerol monostearate in the ratio ranging from 1:3 to 3:1 by weight which is comparable to the lowering of torque release by the unsaturated fatty amide erucamide and provides improved organoleptic properties of the liquid as compared to erucamide.

Preferably, a polyethylene cap composition comprising at least 94% by weight of polyethylene, 0.05 to 1% by weight of a slip and/or antiblocking agent comprising a mixture of linear saturated fatty amide(s) and glycerol monostearate in the ratio ranging from 1:3 to 3:1 by weight with % torque release of the cap comparable to the unsaturated fatty amide erucamide at room temperature and under refrigerated conditions; wherein the processed cap is used to seal liquid containers and provides improved organoleptic properties when compared with erucamide.

The polyethylene cap prepared by using polyethylene cap composition of the present invention is used to seal liquid containers and provide better retention of the organoleptic properties of the liquid as compared to erucamide. The liquids may be mineral water or carbonated drinks.

The polyethylene cap composition of the present invention comprising a mixture of linear saturated fatty amide(s) and glycerol monostearate in the ratio ranging from 1:3 to 3:1 by weight is stable at processing temperature range and retains color intensity of caps.

The polyethylene cap composition of the present invention comprising a mixture of linear saturated fatty amide(s) and glycerol monostearate in the ratio ranging from 1:3 to 3:1 by weight has improved yellowness index when compared with erucamide.

According to the sixth embodiment of the present invention is a polyethylene film composition with slip and/or antiblocking agent comprising a mixture of linear saturated fatty amide(s) and glycerol monostearate in the ratio ranging from 1:3 to 3:1 by weight with static and kinetic coefficient of friction comparable to the unsaturated fatty amide erucamide.

Preferably, a polyethylene film composition comprising at least 94% by weight of polypropylene, 0.05 to 1% by weight of a slip and/or antiblocking agent comprising a mixture of linear saturated fatty amide and glycerol monostearate in the ratio ranging from 1:3 to 3:1 by weight with static and kinetic coefficient of friction comparable to the unsaturated fatty amide erucamide.

Definition of Terms

Torque release is the moment of a force tending to cause rotation of an appropriate closure in a direction opposite to that of closing, causing the closure to be unsecured from its position on the neck finish of an appropriate container.

Melt flow index or MFI is a measure of the ease of flow of the melt of a thermoplastic material. It is defined as the mass of polymer, in grams, flowing in ten minutes through a capillary of a specific diameter and length by a pressure applied via prescribed alternative gravimetric weights for alternative prescribed temperatures. The method is described in the similar standards ASTM D1238 and ISO 1133.

Fusion Time and Fusion Torque

When Polymer compound is mixed under appropriate conditions of heat and shear, a fused mass is produced. This mass has certain melt characteristics which can be defined with a torque rheometer operated under fixed conditions of shear and temperature. Fusion time is the time required to get a molten mass at a certain temperature and shear with the fixed mass. Fusion torque is the Torque at this point i.e. at Fusion Time.

Coefficient of Friction ASTM D1894

Coefficient of friction is the ratio of the force required to move one surface over another to the total force applied normal to those surfaces.

Kinetic coefficient of friction is the ratio of the force required to move one surface over another to the total force applied normal to those surfaces, once that motion is in progress.

Static coefficient of friction is the ratio of the force required to move one surface over another to the total force applied normal to those surfaces, at the instant motion starts.

Organoleptic Properties

The term Organoleptic is defined as the perception of food (or an object) with respect to the five senses namely sight, hearing, touch, taste and smell.

In the present invention organoleptic properties are with regards to taste and smell.

The following examples illustrate preferred embodiments in accordance with the present invention without limiting the scope of the invention.

EXAMPLES

Example 1

Test Method for the Determination of Torque Release of the Caps
Summary:
The representative injection moulded caps are held in torque meter, the specific closing torque is applied and then the removal torque (the torque necessary to loosen the closure) is determined.
Apparatus:
1. Torque Meter: The scale 0 to 6.0 Nm, minimum accuracy 0.1 Nm
2. The Container Holder: To hold the container firmly on its place, so that the measurement can be taken accurately.
3. The Closure Fixture: Of the appropriate size of the closure (for the mineral water and carbonated cold drink containers)
Conditioning:
Condition the closures at room temperature for minimum 48 hrs (2 days) before the testing.
Procedure:
1. Firmly position the container (mineral water bottle or carbonated cold drink bottle) in the container holder. Fix the closure or the cap under test in the fixture.
2. Fix the fixture (with the closure inside) to the container, avoiding any contact with the container.
3. Fix the torque meter, keeping red pointer at left side. Rotate clockwise slowly, at constant rate, watching the gauge until the desired/predetermined constant torque is indicated on the needle.
4. Keeping the torque meter in its place, bring the red needle to the right hand side, rotate anticlockwise, slowly, watching the gage, avoiding any contact with the container. The highest figure indicated will be release or removal torque of the closure.
5. Minimum 10 caps/closures should be tested after 48 hrs conditioning and thereafter 5, 10, 15 and 30 days OR till the constant release torque is obtained.
6. Measure dimensions and weights of the caps under test. (10 nos. minimum)
Report:
a. Closing Torque, Release Torque (Avg. of 10 values), in Nm, after 2, 5, 10, 15 and 30 days.
b. Polymer used for the closures.
c. Additive concentration.
The following abbreviations are used—
E: Erucamide
C: Composition of the present invention is 75% by weight distilled glycerol monostearate of 90% purity+25% by weight behenamide Example 2: Rheological Properties of Polypropylene

|  | Control | 1 | 2 |
|---|---|---|---|
| PP Cap Grade (MFI 3.5) | 100.0 | 95.0 | 95.0 |
| C ppm | — | 5.0 | — |
| E ppm | — | — | 5.0 |

Haake conditions @180° C./40 rpm/45 gms/15 mins

| Fusion time min | 2.40 | 4.26 | 3.40 |
| Avg TorqueNm 15 mins | 6.10 | 2.30(−62%) | 2.60(−57%) |

-continued

| | | | |
|---|---|---|---|
| Color of the mass (yellowness index ASTM-D1925) | 1.7 | 11.1 | 15.3 |
| Stickiness to rotor | | Non sticky | Non sticky |

Example 3: Flow Properties of Polypropylene with Slip Agent @5000 ppm

| | Control | C | E |
|---|---|---|---|
| Melt Flow Index gm/10 min. @230° C./2.16 kg | 4.32 | 6.14(+42%) | 5.32(+23%) |

Example 4: % Torque Release of Polypropylene Caps—Mineral Water Bottle

| | 2500 ppm | 5000 ppm | 7500 ppm | 10000 ppm |
|---|---|---|---|---|
| PP Cap Grade (MFI | 9% | | | |
| C | 49% | 52% | 55% | 58% |
| E | 48% | 53% | 55% | 56% |

Example 5: % Torque Release of PP Caps—Carbonated Drink Bottle

| | 2500 ppm | 5000 ppm | 7500 ppm | 10000 ppm |
|---|---|---|---|---|
| PP Cap Grade (MFI | 7% | | | |
| C | 10% | 14% | 17% | 19% |
| E | 10% | 14% | 17% | 18% |

Example 6: % Torque Release of PP Caps at Refrigerated Conditions (10° C.) 5000 ppm

| | Control | C | E |
|---|---|---|---|
| % Torque Release in mineral water bottle | 15 | 50 | 51 |
| % Torque Release in carbonated drink bottle | 7 | 14 | 14 |

Example 7: Polypropylene Film—Static Coefficient of Friction

| | 1 hr | 48 hr | 72 hr |
|---|---|---|---|
| PP Cap Grade (MFI 2500 ppm | 0.26 | 0.25 | 0.25 |
| C | 0.25 | 0.24 | 0.21 |
| E | 0.24 | 0.24 | 0.21 |
| 5000 ppm | | | |
| C | 0.26 | 0.23 | 0.23 |
| E | 0.25 | 0.23 | 0.23 |
| 7500 ppm | | | |
| C | 0.25 | 0.19 | 0.19 |
| E | 0.24 | 0.19 | 0.19 |
| 10000 ppm | | | |
| C | 0.23 | 0.20 | 0.21 |
| E | 0.22 | 0.19 | 0.21 |

Example 8: Polypropylene Film—Kinetic Coefficient of Friction

| | 1 hr | 48 hr | 72 hr |
|---|---|---|---|
| PP Cap Grade (MFI 2500 ppm | 0.25 | 0.25 | 0.23 |
| C | 0.24 | 0.21 | 0.20 |
| E | 0.23 | 0.20 | 0.20 |
| 5000 ppm | | | |
| C | 0.24 | 0.19 | 0.19 |
| E | 0.23 | 0.19 | 0.18 |
| 7500 ppm | | | |
| C | 0.23 | 0.17 | 0.17 |
| E | 0.22 | 0.17 | 0.17 |
| 10000 ppm | | | |
| C | 0.19 | 0.17 | 0.16 |
| E | 0.19 | 0.17 | 0.16 |

Example 9: Torque Release Results of HDPE Caps

Polymer: HDPE (MB5568) of *Borealis*, MFI 0.8 g/10 min @190° C., 2.16 kg.
Process: Master batch preparation (5%, w/w) followed by Injection molding.
Conditioning: 48 hrs at R.T. to release stresses developed during molding.
Testing: Release torque measurement by keeping the closing torque constant.
Caps: Mineral water bottle caps
Results:

| | Torque Release Nm | | | | | | | | | |
|---|---|---|---|---|---|---|---|---|---|---|
| Closing Torque 3.0 Nm | 2,500 ppm on Days | | | | | Torque Release % | | | | |
| Sample | 2 | 5 | 10 | 15 | 30 | 2 | 5 | 10 | 15 | 30 |
| HDPE Control | 1.11 | 1.09 | 1.07 | 1.11 | 1.09 | 37.0 | 36.3 | 35.7 | 37.0 | 36.3 |
| HDPE + E | 0.53 | 0.50 | 0.46 | 0.43 | 0.40 | 17.7 | 16.7 | 15.3 | 14.3 | 13.3 |
| HDPE + C | 0.70 | 0.68 | 0.64 | 0.60 | 0.53 | 23.3 | 22.7 | 21.3 | 20.0 | 17.7 |

-continued

| Closing Torque 3.0 Nm | Torque Release Nm | | | | | Torque Release % | | | | |
|---|---|---|---|---|---|---|---|---|---|---|
| | 2,500 ppm on Days | | | | | | | | | |
| Sample | 2 | 5 | 10 | 15 | 30 | 2 | 5 | 10 | 15 | 30 |
| HDPE Control | 1.00 | 0.98 | 0.96 | 1.02 | 1.00 | 33.3 | 32.7 | 32.0 | 34.0 | 33.3 |
| HDPE + E | 0.50 | 0.46 | 0.41 | 0.40 | 0.38 | 16.7 | 15.3 | 13.7 | 13.3 | 12.7 |
| HDPE + C | 0.64 | 0.59 | 0.55 | 0.50 | 0.48 | 21.3 | 19.7 | 18.3 | 16.7 | 16.0 |

Example 10: Organolepticity Index of HDPE Caps after Exposure to the Sunlight for 72 Hrs Procedure Glass bottles containing 500 ml potable water were fitted with test caps.

These bottles were exposed to sun light for 72 hrs, horizontally.

Exposed water was tasted for flavour. Rating given by the panelist is as below

Dosage level: 5000 ppm.

Reference: Lines 11 to 31 on column 5 of U.S. Pat. No. 7,750,082, B2

| Rating | |
|---|---|
| 1 | Good Taste |
| 2 | Neutral Taste |
| 3 | Poor Taste |
| 4 | Bad Taste |

SUMMARY

| | No. of peoples rated out of 12 | | | |
|---|---|---|---|---|
| Sample | Good | Neutral | Poor | Bad |
| HDPE Control | 7 | 4 | 1 | — |
| HDPE + E | — | 2 | 5 | 5 |
| HDPE + C | 9 | 3 | — | — |

Remarks:
1. Organolepticity index of C is good
2. Organplepticity index of E is bad

The invention claimed is:

1. A polypropylene cap composition, comprising
   (i) at least 94% by weight of polypropylene, and
   (ii) 0.05% to 1.0% by weight of a slip and/or an anti-blocking agent;
   wherein the slip and/or anti-blocking agent comprises 25% by weight behenamide and 75% by weight distilled glycerol monostearate of 90% purity.

2. The polypropylene cap composition according to claim 1, further comprising processing into caps, wherein the cap is used to seal liquid containers and provides improved organoleptic properties when compared with erucamide.

3. A polyethylene cap composition, comprising
   (i) at least 94% by weight of polyethylene, and
   (ii) 0.05% to 1.0% by weight of a slip and/or an anti-blocking agent;
   wherein the slip and/or anti-blocking agent comprises 25% by weight behenamide and 75% by weight distilled glycerol monostearate of 90% purity.

4. The polyethylene cap composition according to claim 3, further comprising processing into caps, wherein the cap is used to seal liquid containers and provides improved organoleptic properties when compared with erucamide.

* * * * *